(12) United States Patent
Chuang et al.

(10) Patent No.: US 10,743,031 B2
(45) Date of Patent: Aug. 11, 2020

(54) METHOD AND APPARATUS FOR SYNTAX REDUNDANCY REMOVAL IN PALETTE CODING

(71) Applicant: HFI Innovation Inc., Zhubei, Hsinchu County (TW)

(72) Inventors: Tzu-Der Chuang, Zhubei (TW); Yu-Chen Sun, Keelung (TW); Yi-Wen Chen, Taichung (TW); Yu-Wen Huang, Taipei (TW)

(73) Assignee: HFI Innovation Inc., Zhubei, Hsinchu County (TW)

(*) Notice: Subject to any disclaimer, the term of this patent is extended or adjusted under 35 U.S.C. 154(b) by 82 days.

(21) Appl. No.: 15/107,913

(22) PCT Filed: Dec. 26, 2014

(86) PCT No.: PCT/CN2014/095143
§ 371 (c)(1),
(2) Date: Jun. 23, 2016

(87) PCT Pub. No.: WO2015/096808
PCT Pub. Date: Jul. 2, 2015

(65) Prior Publication Data
US 2016/0323584 A1   Nov. 3, 2016

Related U.S. Application Data

(60) Provisional application No. 62/015,708, filed on Jun. 23, 2014, provisional application No. 61/932,832,
(Continued)

(51) Int. Cl.
*H04N 19/70* (2014.01)
*H04N 19/186* (2014.01)
(Continued)

(52) U.S. Cl.
CPC .......... *H04N 19/70* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS 7,343,037 B1   3/2008   Kadatch
9,654,806 B2   5/2017   Zou et al.
(Continued)

FOREIGN PATENT DOCUMENTS

CN   101068352 A   11/2007
CN   101217668 A   7/2008
(Continued)

OTHER PUBLICATIONS

Guo et al., "RCE3: Results of Test 3.1 on Palette Mode for Screen Content Coding," Joint Collaborative Team on Video Coding (JCT-VC) of ITU-T SG 16 WP 3 and ISO/IEC JTC1/SC 29/WG 11, 14th Meeting: Vienna, AT, Jul. 25-Aug. 2, 2013 Document: JCTVC-N0247.*
(Continued)

*Primary Examiner* — Michael J Hess
(74) *Attorney, Agent, or Firm* — Oblon, McClelland, Maier & Neustadt, L.L.P.

(57) ABSTRACT

A method and apparatus for palette coding of a block of video data using a candidate prediction mode list with syntax redundancy removed are disclosed. In one embodiment, whether a redundant prediction mode exists in the candidate prediction mode list for the current samples of the current block is determined based on the candidate prediction mode list and the previous prediction mode associated with the previous samples. If the redundant prediction mode
(Continued)

exists in the candidate prediction mode list, the redundant prediction mode is removed from the candidate prediction mode list to generate a reduced candidate prediction mode list. In another embodiment, whether a redundant predictor exists in a candidate predictor list for a current sample of the current block is determined based on a condition related to one or more predictors for the current sample of the current block.

30 Claims, 2 Drawing Sheets

Related U.S. Application Data filed on Jan. 29, 2014, provisional application No. 61/924,758, filed on Jan. 8, 2014, provisional application No. 61/924,333, filed on Jan. 7, 2014, provisional application No. 61/922,131, filed on Dec. 31, 2013, provisional application No. 61/921,156, filed on Dec. 27, 2013.

(51) Int. Cl.

| | |
|---|---|
| H04N 19/91 | (2014.01) |
| H04N 19/56 | (2014.01) |
| H04N 19/52 | (2014.01) |
| H04N 19/463 | (2014.01) |
| H04N 19/48 | (2014.01) |
| H04N 19/93 | (2014.01) |
| H04N 19/593 | (2014.01) |
| H04N 19/105 | (2014.01) |
| H04N 19/159 | (2014.01) |
| H04N 19/182 | (2014.01) |

(52) U.S. Cl.
CPC ......... *H04N 19/182* (2014.11); *H04N 19/186* (2014.11); *H04N 19/463* (2014.11); *H04N 19/48* (2014.11); *H04N 19/52* (2014.11); *H04N 19/56* (2014.11); *H04N 19/593* (2014.11); *H04N 19/91* (2014.11); *H04N 19/93* (2014.11)

(56) References Cited

U.S. PATENT DOCUMENTS

| | | | |
|---|---|---|---|
| 9,749,628 B2 | 8/2017 | Chuang et al. | |
| 2009/0074307 A1 | 3/2009 | Lu et al. | |
| 2009/0110305 A1 | 4/2009 | Fenney | |
| 2009/0147855 A1 | 6/2009 | Song et al. | |
| 2011/0135000 A1 | 6/2011 | Alshina et al. | |
| 2013/0003837 A1 | 1/2013 | Yu et al. | |
| 2013/0170546 A1 | 7/2013 | Kim et al. | |
| 2013/0251046 A1 | 9/2013 | Matsunobu et al. | |
| 2013/0272401 A1* | 10/2013 | Seregin ............ H04N 19/00533 375/240.12 | |
| 2013/0301734 A1* | 11/2013 | Gisquet ............ H04N 19/00696 375/240.16 | |
| 2014/0003531 A1 | 1/2014 | Coban et al. | |
| 2014/0086333 A1 | 3/2014 | Wang | |
| 2014/0105002 A1 | 4/2014 | Pan | |
| 2014/0241630 A1 | 8/2014 | MacInnis et al. | |
| 2014/0286427 A1* | 9/2014 | Fukushima ........ H04N 19/105 375/240.16 | |
| 2014/0301475 A1 | 10/2014 | Guo et al. | |
| 2015/0016501 A1* | 1/2015 | Guo .................. G06T 9/00 375/240.02 | |
| 2015/0146976 A1 | 5/2015 | Ma et al. | |

FOREIGN PATENT DOCUMENTS

| | | | |
|---|---|---|---|
| CN | 101340587 A | | 1/2009 |
| CN | 101365136 A | | 2/2009 |
| CN | 101816177 A | | 8/2010 |
| CN | 103248893 A | | 8/2013 |
| EP | 2 645 719 | | 10/2013 |
| WO | 2009/036255 A2 | | 3/2009 |
| WO | 2012/147622 A1 | | 11/2011 |
| WO | 2012/160890 A1 | | 11/2012 |
| WO | WO 2012/171463 | | 12/2012 |
| WO | 2013/046095 A1 | | 4/2013 |
| WO | 2013/069216 A1 | | 5/2013 |
| WO | 2012/147622 A1 | | 7/2014 |
| WO | 2015/179814 A1 | | 11/2015 |

OTHER PUBLICATIONS

International Search Report dated Apr. 1, 2015, issued in application No. PCT/CN2014/095143.

Guo L., et al; "RCE3: Results of Test 3.1 on Palette Mode for Screen Content Coding;" Joint Collaborative Team on Video Coding (JCT-VC) of ITU-T SG 16 WP 3 and ISO/IEC JTC 1/SC 29/WG 11; Aug. 2013; pp. 1-7.

Sun, Y.C., et al.; "Non-RCE4: Removal of syntax redundancy in RCE4 Test2;" Joint Collaborative Team on Video Coding (JCT-VC) of ITU-T SG 16 WP 3 and ISO/IEC JTC 1/SC 29/WG 11; Jan. 2014.

Chuang, T.D., et al.; "Non-RCE4: Four-neighbor major color index prediction;" Joint Collaborative Team on Video Coding (JCT-VC) of ITU-T SG 16 WP 3 and ISO/IEC JTC 1/SC 29/WG 11; Jan. 2014.

Sun, Y.C., et al.; "AHG10: A triplet palette mode combining JCTVC-P0108 and JCTVC-P0198;" Joint Collaborative Team on Video Coding (JCT-VC) of ITU-T SG 16 WP 3 and ISO/IEC JTC 1/SC 29/WG 11; Mar.-Apr. 2014; pp. 1-9.

Guo, L., et al.; "Non-RCE3: Modified Palette Mode for Screen Content Coding;" Joint Collaborative Team on Video Coding (JCT-VC) of ITU-T SG 16 WP 3 and ISO/IEC JTC 1/SC 29/WG 11; Jul.-Aug. 2013; pp. 1-6.

Yu, Y., et al.; "Adaptive Scan for Large Blocks for HEVC;" Joint Collaborative Team on Video Coding (JCT-VC) of ITU-T SG16 WP3 and ISO/IEC JTC1/SC29/WG11; Jul. 2011; pp. 1-6.

Zhu, J., et al.; "Adaptive Scan Oder on Palette Based Coding;" Joint Collaborative Team on Video Coding (JCT-VC) of ITU-T SG 16 WP 3 and ISO/IEC JTC 1/SC 29/WG 11; Mar.-Apr. 2014; pp. 1-4.

Esenlik, S., et al.; "AHG4: Dependent slices restriction;" Joint Collaborative Team on Video Coding (JCT-VC) of ITU-T SG 16 WP 3 and ISO/IEC JTC 1/SC 29/WG 11; Oct. 2012; pp. 1-6.

Guo, X., et al.; "AHG8: Major-color-based screen content coding;" Joint Collaborative Team on Video Coding (JCT-VC) of ITU-T SG 16 WP 3 and ISO/IEC JTC 1/SC 29/WG 11; Jan. 2014; pp. 1-12.

Chen, J., et al.; "Description of screen content coding technology proposal by Qualcomm;" Joint Collaborative Team on Video Coding (JCT-VC) of ITU-T SG 16 WP 3 and ISO/IEC JTC 1/SC 29/WG 11; Mar.-Apr. 2014; pp. 1-19.

Misra, K., et al.; "Modifications to palette coding for tiles/slices/dependent slices/wavefronts;" Joint Collaborative Team on Video Coding (JCT-VC) of ITU-T SG 16 WP 3 and ISO/IEC JTC 1/SC 29/WG 11; Jun.-Jul. 2014; pp. 1-4.

Zhu, W., et al.; "Non-RCE3 Template-based palette prediction;" Joint Collaborative Team on Video Coding (JCT-VC) of ITU-T SG 16 WP 3 and ISO/IEC JTC 1/SC 29/WG 11; Apr. 2013; pp. 1-8.

Sun, Y.C., et al.; "Non-RCE4 Cross-CU major color index prediction;" Joint Collaborative Team on Video Coding (JCT-VC) of ITU-T SG 16 WP 3 and ISO/IEC JTC 1/SC 29/WG 11; Jan. 2014; pp. 1-5.

Laroche, G., et al.; "Non-RCE4: Palette Prediction for Palette mode;" Joint Collaborative Team on Video Coding (JCT-VC) of ITU-T SG 16 WP 3 and ISO/IEC JTC 1/SC 29/WG 11; Jan. 2014; pp. 1-6.

Seregin, V., et al.; "Non-SCCE3: Palette predictor resetting;" Joint Collaborative Team on Video Coding (JCT-VC) of ITU-T SG 16 WP 3 and ISO/IEC JTC 1/SC 29/WG 11; Jun.-Jul. 2014; pp. 1-4.

(56) References Cited

OTHER PUBLICATIONS

Guo, L., et al.; "Palette Mode for Screen Content Coding;" Joint Collaborative Team on Video Coding (JCT-VC) of ITU-T SG 16 WP 3 and ISO/IEC JTC 1/SC 29/WG 11; Apr. 2013; pp. 1-24.

Joshi, R., et al.; "RCE2: Summary report on HEVC Range Extensions Core Experiment 2 (RCE2) on prediction and coding techniques for transform-skip and transform-bypass blocks;" Joint Collaborative Team on Video Coding (JCT-VC) of ITU-T SG 16 WP 3 and ISO/IEC JTC 1/SC 29/WG 11; Jul.-Aug. 2013; pp. 1-12.

Guo, X., et al.; "RCE4 Test 1. Major-color-based screen content coding;" Joint Collaborative Team on Video Coding (JCT-VC) of ITU-T SG 16 WP 3 and ISO/IEC JTC 1/SC 29/WG 11; Jan. 2014; pp. 1-12.

Sun, Y.C., et al.; "SCCE3 Test B.4: Adaptive color index map scan;" Joint Collaborative Team on Video Coding (JCT-VC) of ITU-T SG 16 WP 3 and ISO/IEC JTC 1/SC 29/WG 11; Jun.-Jul. 2014; pp. 1-16.

* cited by examiner

METHOD AND APPARATUS FOR SYNTAX REDUNDANCY REMOVAL IN PALETTE CODING

CROSS REFERENCE TO RELATED APPLICATIONS

The present invention claims priority to U.S. Provisional Patent Application Ser. No. 61/921,156, filed on Dec. 27, 2013, U.S. Provisional Patent Application Ser. No. 61/922,131, filed on Dec. 31, 2013, U.S. Provisional Patent Application Ser. No. 61/924,333, filed on Jan. 7, 2014, U.S. Provisional Patent Application Ser. No. 61/924,758, filed on Jan. 8, 2014, U.S. Provisional Patent Application Ser. No. 61/932,832, filed on Jan. 29, 2014 and U.S. Provisional Patent Application Ser. No. 62/015,708, filed on Jun. 23, 2014. The U.S. Provisional patent applications are hereby incorporated by reference in their entireties.

TECHNICAL FIELD

The present invention relates to palette coding for video data. In particular, the present invention relates to techniques to improve the performance of palette coding by removing syntax redundancy that may exist in existing systems.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the palette coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the palette coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247). In JCTVC-N0247, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the palette size is first transmitted followed by the palette elements.
2. Transmission of pixel values: the pixels in the CU are encoded in a raster scan order. For each group of one or more pixels, a flag for a run-based mode is first transmitted to indicate whether the "run" mode or "copy above" mode is being used.

2.1 "index run" mode: In the "index run" mode, a palette index is first signaled followed by "palette_run" (e.g., M) representing the run value. The run value indicates that a total of M+1 samples are all coded using "index run" mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.

2.2 "copy above run" mode: In the "copy above run" mode, a value "copy_run" (e.g., N) is transmitted to indicate that for the following N positions (including the current one), the palette index is the same as the corresponding palette index in the row above.

3. Transmission of residue: the palette indices transmitted in Stage 2 are converted back to pixel values and used as the prediction. Residue information is transmitted using HEVC residual coding and is added to the prediction for the reconstruction.

In the above approach, other than the "index run" mode and the "copy above run" mode, a current pixel may also be coded by "pixel" mode, where the pixel value is transmitted. Another version of the palette coding technique has also been disclosed by Guo et al., in JCTVC-N0249 (Guo et al., "*Non-RCE3: Modified Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0249), where each element in the palette is a triplet representing a specific combination of the three color components. The palette index is shared by all color components to reduce overhead.

Yet another major color-base coding (palette coding) method is disclosed by Guo et al. in JCTVC-O0182 (Guo et al., "*AHG8. Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). According to JCTVC-O0182, the palette of each component are constructed and transmitted. However, instead of predicting the entire palette from the left CU, individual entry in a palette can be predicted from the exact corresponding palette entry in the above CU or left CU.

According to JCTVC-O0182, a predictive coding method is applied on the indices for transmission of pixel values, where a pixel line can be predicted by different modes. In specific, three kinds of line modes are used for a pixel line, i.e. horizontal mode, vertical mode and normal mode. In horizontal mode, all the pixels in the same line have the same value. If the value is the same as the first pixel of the above pixel line, only line mode signaling bits are transmitted. Otherwise, the index value is also transmitted. In vertical mode, the current pixel line is the same with the above pixel line. Therefore, only line mode signaling bits are transmitted. In normal mode, pixels in a line are predicted individually. For each pixel, the left or above neighboring pixel is used as predictor, and the prediction symbol is transmitted to the decoder. Furthermore, pixels are classified into major color pixels and escape pixels. For major color pixels, the decoder reconstructs the pixel values using the major color indices and palette. For escape pixels, the encoder will further send the pixel values.

It is desirable to develop methods for further improving the coding efficiency associated with the palette coding.

SUMMARY

A method and apparatus for palette coding of a block of video data using a candidate prediction mode list with syntax redundancy removed are disclosed. In one embodiment, whether a redundant prediction mode exists in the candidate prediction mode list for the current samples of the current block is determined based on a combination of one or more of the candidate prediction mode list, the previous prediction mode associated with the previous samples, position of the current sample. If the redundant prediction mode exists in the candidate prediction mode list, the redundant prediction mode is removed from the candidate prediction mode list to generate a reduced candidate prediction mode list, and palette encoding or decoding is applied to the current samples of the current block using the reduced candidate prediction mode list.

In one embodiment, the candidate prediction mode list consists of a copy-above-run mode, an index-run mode. The copy-above-run mode uses the corresponding samples in an above row to predict the current samples in the current block. The index-run mode encodes or decodes the current samples of the current block using a same first sample value. When the previous prediction mode is equal to the copy-above-run mode, the copy-above-run mode is redundant. The candidate prediction mode list may further comprise a pixel mode to encode or decode an individual pixel sample value of an individual sample of the current block. When the copy-above-run mode is used for the current samples of the current block, a run value corresponding to the number of the current samples is signaled in a bitstream or parsed from the bitstream. When the index-run mode is used for the current samples of the current block, the same sample value and a run value corresponding to a number of the current samples of the current block are signaled in a bitstream or parsed from the bitstream. The candidate prediction mode list further comprises a copy-above-N-row mode to use one or more corresponding first samples in above R rows to predict one or more first samples of the current block.

In another embodiment, the system determines whether a redundant predictor exists in the candidate predictor list for a current sample of the current block based on a condition related to the predictors for the current sample of the current block. If the redundant predictor exists in the candidate predictor list, the redundant predictor is removed or replaced to generate a modified candidate predictor list. Palette encoding or decoding is then applied to the current sample of the current block using the modified candidate predictor list.

The candidate predictor list may consist of a copy-above predictor to use a sample in an above row to predict the current sample, a copy-left predictor to use a left sample to predict the current sample, and one or more other modes. If the copy-above predictor and the copy-left predictor are the same for the current sample, the copy-above predictor or the copy-left predictor is redundant. In this case, the copy-above predictor or the copy-left predictor is removed from the candidate predictor list.

When a redundant predictor exists, the redundant predictor may also be replaced by a replacement candidate predictor determined based on sample position of a selected candidate predictor or a last coded syntax. For example, if the sample position of the selected candidate predictor is outside the current block, the selected candidate predictor is not placed into the modified candidate predictor list. In another example, if the candidate predictor list consists of a copy-above predictor to use a sample in an above row to predict the current sample and the last coded syntax is the copy-above predictor, the last coded syntax is not placed into the modified candidate predictor list. The system may further determine whether a current prediction mode is placed into the candidate prediction mode list depends on position of said one or more current samples of the current block or coded syntax for the current prediction mode. For example, the current prediction mode is not placed into the candidate prediction mode list if reference pixels of the current prediction mode are not available. In another example, a last prediction mode corresponding to a last coded syntax is not placed into the candidate prediction mode list. In yet another example, a prediction mode index corresponding to the current prediction mode is signaled in a bitstream or parsed from the bitstream.

DETAILED DESCRIPTION

Figure 1:
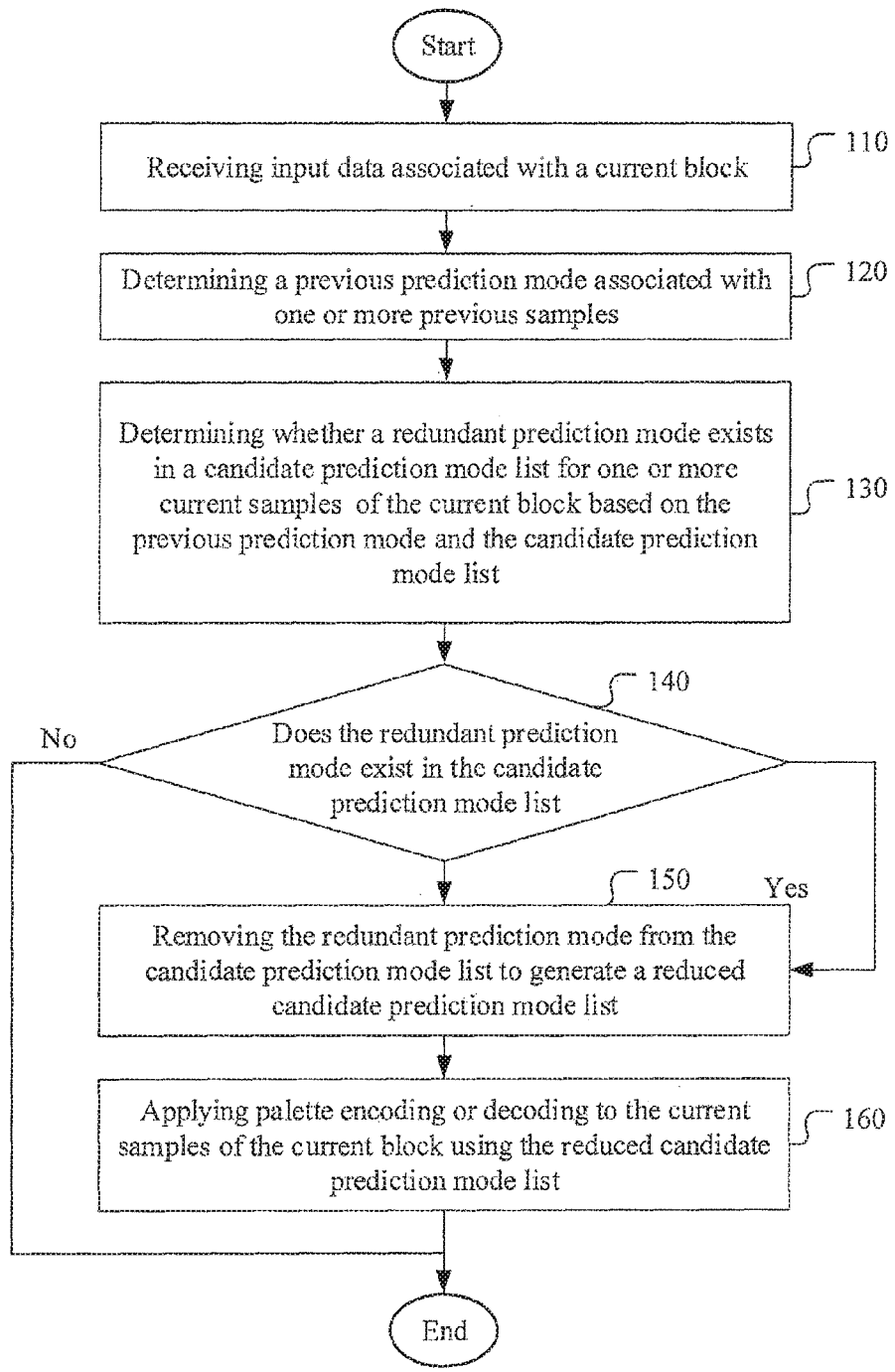
FIG. 1 illustrates an exemplary flowchart of a system for palette coding using a candidate prediction mode list with the redundant prediction mode according to an embodiment of the present invention.

In the present invention, various techniques to improve the performance of palette coding are disclosed. In particular, efficient palette coding techniques using a candidate prediction mode list or a candidate predictor list with redundancy removed are disclosed.

Removal of Prediction Mode Signaling Bits Redundancy.

As mentioned before, in the run-based palette as described in JCTVC-N0247 and N0249, the color index is coded using "index-run" mode and "copy-above-run" mode. In the "index-run" mode, it checks whether the following color indices are the same as the current color index. If so, it signals the "index-run" mode and a color index value for the current sample. It further determines the "run" length, i.e., the number of consecutive same color indices including the current one. In the "copy-above-run" mode, it checks whether following color indices are the same as corresponding color indices in the above row. If so, it signals the "copy-above-run" mode. Then it further determines the "run" length, i.e., the number of consecutive same color indices as the corresponding color indices in the above row including the current one. If the previous coding pattern is "copy-above-run" mode with a run value equal to M, the next pattern should not be "copy-above-run" mode. If the next pattern is also the "copy-above-run" mode with a run equal to N, the two patterns would have been combined into a single "copy-above-run" mode with a run value equal to (M+N+1). Therefore, an embodiment according to the present invention removes "copy-above-run" mode signaling if the previous coding pattern is a "copy-above-run" mode. While the above example eliminates the syntax redundancy by checking the case of two consecutive "copy-above-run" modes, the present invention may analyze the previous decoded prediction modes and then change the signaling method according to the previous coded prediction modes.

A pseudo code corresponding to JCTVC-N0247 is shown as follow.

```
code palette_run_mode
if (palette_run_mode == index_run_mode)
{
    code palette_idx
}
code palette_run
```

In the above pseudo code, syntax palette_run_mode corresponds to the "copy-above-run" mode or the "index-run" mode. If it is the "index-run" mode (i.e., palette_run_mode==index_run_mode), the palette index for the current color index is transmitted (i.e., code palette_idx) followed by an associated run length (i.e., code palette_run). If it is not the "index-run" mode (i.e., "copy-above-run" mode being used), only the run length is coded (i.e., code palette_run) since the leading color index can be determined from the above row. The "copy-above-run" mode are also called "copy top run" mode, "copy above" mode or "copy top" mode. These names are used interchangeably in this disclosure.

A pseudo code corresponding to an embodiment of the present invention is shown as follows.

```
if( last_coded_palette_run_mode == index_run_mode)
{
code palette_run_mode
if (palette_run_mode == index_run_mode)
{
    code palette_idx
}
code palette_run
} else
{
    code palette_idx
    code palette_run
}
```

As shown in the above pseudo code for the current embodiment, the pseudo code corresponding to JCTVC-N0247 is performed only when the previous coding pattern is a "index run mode", i.e., if (last_coded_palette_run_mode==index_run_mode)==True. In other words, the syntax palette_run_mode will only be coded if the previous coded pattern is not a "copy-above-run" mode so that no consecutive "copy-above-run" modes will occur. When the syntax palette_run_mode is not presented, the palette_run_mode is inferred as index_run_mode (the index-run mode).

As mentioned before, the palette coding as disclosed in JCTVC-N0247, JCTVC-O0182 and JCTVC-B0249 support the "index run" mode, "copy top" mode, "horizontal" mode and "vertical" mode. In order to improve the performance, additional palette index coding modes (i.e., prediction modes) are disclosed according to the present invention. Furthermore, when the neighboring palette index value used to predict current palette index is not available, a default index value (e.g. zero), a derived index value based on the neighboring pixels, a default value (e.g., zero), or a derived value based on the pixel value of the neighboring reconstructed pixels are used according to an embodiment of the present invention.

In another embodiment of the present invention, the relationship among the predictors is checked. If any syntax redundancy is determined, the syntax redundancy is removed. For example, if the current coding predictor is equal to one of the previous coded predictor, it can be skipped. Table. 1 illustrates another example according to an embodiment of the present invention compared to that of JCTVC-O0182. Signal bits in according to JCTVC-O0182 for various predictors are shown in the second column. The embodiment of the present invention checks the relation between predictors corresponding to color indexes of the above pixel (A) and the left pixel (L). Depending on whether the left color index (i.e., left predictor) is the same as the above color index (i.e., above predictor), different signal bits are shown in the third and fourth columns in Table 1. As shown in the fourth column, if the color index of the left pixel is equal to the color index of the above pixel, and the color index of the current pixel is not equal to the above pixel, the signaling of the second bit can be skipped since there are no other cases to be differentiated. In other words, the current pixel is either predicted by the above pixel (same as the left pixel) or not predicted by any of the above and the left pixel. In the example illustrated in Table 1, the signal bit for the "copy left" mode is skipped. However, signal bit "1" can be assigned to indicate "copy left" mode so that the signal bit for "copy top" is skipped. Alternatively, both the "copy top" and "copy left" modes can be assigned the same signal bit, i.e., "1".

TABLE 1

| Prediction Mode | Signal Bits according to JCTVC-O0183 | Signal Bits if L != A | Signal Bits if L == A |
| --- | --- | --- | --- |
| copy top | 1 | 1 | 1 |
| copy left | 01 | 01 | (Removed) |
| no prediction | 00 | 00 | 0 |

An exemplary pseudo code to implement the signaling method of Table 1 is illustrated as follows.

```
code equal_to_above
    if (L != A && equal_to_above = 0)
        code equal_to_left
    else
        code normal_predictor
```

As shown in the above pseudo code, the first bit for the "copy top" mode is always coded (i.e., code equal_to_above). If the current pixel is the same as the above pixel, no further bit will be signaled since "equal_to_above=0" will be always false. Otherwise, the bit for the "copy left" mode (i.e., code equal_to_left) will be signaled if the left pixel is not the same as the above pixel (i.e., "L !==A" true). If the current pixel is not the same as the left pixel, the "normal" mode (i.e. no prediction) will be used.

The exemplary signaling bits design shown in Table 1 can be extended to include "copy top-left" mode and "copy top-right" mode as shown in Table 2.

TABLE 2

| Prediction Mode | Signal Bits according to JCTVC-O0183 | Signal Bits if L != A | Signal Bits if L == A, and L != AL && L!= AR |
|---|---|---|---|
| copy top | 1 | 1 | 1 |
| copy left | 01 | 01 | (Removed) |
| No prediction | 00 | 000 | 00 |
| copy top-left | N/A | 0011 | 011 |
| copy top-right | N/A | 0010 | 010 |

An exemplary pseudo code to implement the signaling method of Table 2 is illustrated as follows.

```
code equal_to_above
  if (L != A && equal_to_above = 0)
      code equal_to_left
  if(equal_to_left == 0 && equal_to_above == 0 &&
              ( (AL != L && AL != A) || (AR != L && AR != A))
      code equal_to_AL_or_AR
  if (equal_to_AL_or_AR == 1)
  {
      if((AL != L && AL != A) &&(AR != L && AR != A))
          code equal_to AL
      else if(AL != L && AL != A)
          current pixel = AL
      else
          current pixel = AR
  }
  else
      code normal_predictor
```

While the relationship among the predictors can be used for adaptive signaling of coded bits, the adaptive signaling may also depends on the previous decoded pixels. These previous decoded pixels can be analyzed to determine features or characteristics. Adaptive signaling can then be applied according to the analyzed features or characteristics. For example, if the pixels in previous lines or columns show a strong edge, the signaling method can be modified according to the edge direction. If the edge feature is used for adaptive signaling, various edge detection methods available in the literature can be used. The analysis can be based on pixel values, color indexes, or prediction patterns.

The redundancy check can depends on the sample position. For examples, the redundancy check can be used to remove the "copy top", "copy top-right" and "copy top-left" predictors for pixels in the first row of the CU since these predictors are outside the current block and not available. The redundancy check can also be used to remove the "copy left", "copy top-left" and "copy left-down" predictors for pixels in the first column of the CU. This redundancy check can be applied to horizontal line mode/vertical line mode/normal line mode in JCTVC-O0182.

New Prediction Direction and Syntax for Color Index Map Coding

Another aspect of the present invention addresses new prediction direction and syntax for color index coding to improve the performance of color index coding. In one embodiment, the additional palette index coding modes include:

"copy top-left" mode. In the "copy top-left" mode, a value "copy_run" (e.g., N) is transmitted or derived to indicate that the palette index (also called color index in this disclosure) is equal to the palette index of the top-left location for the following N positions (including the current one).

"copy top-right" mode. In the "copy top-right" mode, a value "copy_run" (e.g., N) is transmitted or derived to indicate that the palette index is equal to the palette index of the top-right location for the following N positions (including the current one).

"copy temporal" mode. In the "copy temporal" mode, a value "copy_run" (e.g., N) is transmitted or derived to indicate that the palette index is equal to the palette index of the collocated location in the temporal reference picture for the following N positions (including the current one).

"copy left" mode. In the "copy left" mode, a value "copy_run" (e.g., N) is transmitted or derived to indicate that the palette index is the same as that at the same location in the left column for the following N positions (including the current one). In one example, N is 1. In another example, the N can be the number of the remaining palette indices that are not coded yet within the same line.

"copy prediction" mode. In the "copy prediction" mode, a value "copy_run" (e.g., N) is transmitted or derived to indicate that for the following N positions (including the current one), the palette index is equal to the palette index of the palette predictor. The palette predictor can be derived from the coded palette index. Furthermore, the coded palette index may include multiple coded rows/columns. For example, the above N rows can be used, where N is an integer. Another example is that the gradient may be propagated if the above rows are used to form a predictor row.

"copy above2line" mode. In "copy above2line" mode, a value "copy_run" (e.g., N) is transmitted or derived to indicate that for the following N positions (including the current one), the palette index is equal to the palette index at a location two lines (i.e. two CU rows) above the current row.

According to the new copy modes described above, multiple copy modes are introduced. For example, there are copy top, copy left, copy top-left, copy top-right, and copy above2line modes. For these copy modes, the copy mode can be adaptively put into a candidate prediction mode list when a redundant prediction mode is removed. Decision regarding which copy mode can be placed into the list can depend on the sample position and the coded syntaxes. For example, if the top, left, top-left, top-right or above2line samples is not available (e.g. outside of the current block), the corresponding copy mode will not be placed into the candidate prediction mode list. Furthermore, the copy mode of the last coded syntax will not be placed into the list. For example, if the last coded syntax is the copy above mode, then the copy above mode will not be put into the list. After generating the copy mode list, a copy mode index is signaled to indicate which copy mode in the list is used. The copy mode index can be coded using a truncated unary code. The copy mode index can also be coded with context bins or equal probability bins.

If the run has a maximum value, the copy mode that can be placed into the list will depend not only on the sample position and the previous coded syntaxes, but also on the last coded run value. The copy mode of the last coded syntax with the run value smaller than maximum run value will not be placed into the list. The copy mode of the last coded syntax with the run equal to the maximum run value will be put into the list.

To further improve the prediction efficiency, a method to use adaptive codeword based on the position of current pixel is disclosed. For example, if the pixel is in the first row, the codewords for "copy above", "copy above-left" and "copy above-right" are excluded. If the pixel is in the first column, the codewords for "copy left" and "copy-down-left" are excluded. This adaptive codeword method can be applied in "normal line mode" as disclosed in JCTVC-O0182.

While the "copy above2line" mode is disclosed above, a similar, but more general mode, named "copy above N row mode" is disclosed as follows. The copy above N row mode can replace the copy above mode and copy above2line mode.

"copy above N row" mode. In "copy above N row" mode, a value "copy_run" (e.g., N) and a value "above_row_index" (e.g., R) are transmitted or derived to indicate that for the following N positions (including the current one), the palette index is equal to the palette index at the location R+1 lines above the current location.

The codeword of above_row_index can depend on the row location of the current sample. For example, if the current sample is in the third row, the above_row_index cannot be larger than 1 (0 for 1 row above, 1 for 2 rows above, 2 for 3 rows above, etc). In other words, the maximum above_row_index is 1. The binary codeword of above_row_index can be adaptive changed according to the sample position. In another example, if the current sample is in the first row, the copy above N row mode is disabled or not allowed. All modes in the first row are inferred as an "index-run" mode. In yet another example, if the current sample is in the second row, the above_row_index is inferred as 0.

The codeword of above_row_index can also depend on the last coded mode. If the last coded mode is "copy above N row" mode and above_row_index is Rprev, and the current prediction mode is also "copy above N row" mode, then the above_row_index of the current prediction mode cannot be Rprev. If two consecutive "copy above N row" modes with the same Rprev occur, the two "copy above N row" modes with the same Rprev would be combined into one with a new run value equal to the sum of two individual run values. If the above_row_index of current mode is Rcur and Rcur is larger than Rprev, the codeword of Rcur can be reduced by 1 since Rcur cannot be the same as Rprev according to this embodiment. For example, if Rprev is 3 and Rcur is 5, the codeword for Rcur is reduced by 1 to become 4. The codeword for the modified Rcur (i.e., 4) is signaled to the decoder. The decoder can recover the original Rcur by comparing the received codeword with Rprev. If the decoded Rcur value corresponding to the received codeword is equal to or larger than Rprev, the actual Rcur is increased by 1 from the decoded Rcur.

The codeword and binarization of above_row_index can depend on the last coded mode, the row index of current sample, and possible maximum number of above_row_index. For example, the binarization method can use a truncated unary. The maximum bit-length may depend on the possible maximum number of above_row_index.

In another embodiment, in additional to the "index-run" mode, "copy top" mode, "horizontal" mode and "vertical" mode, additional palette index coding modes are disclosed to improve the performance as follows.

"copy above pixel" mode, "copy left pixel" mode, "copy above-left pixel" mode, "copy above-right pixel" mode and "copy left-down pixel" mode. In these new modes, a value "copy_run" (e.g., N) is transmitted or derived to indicate that for the following N positions (including the current one), the pixels values are equal to the reconstructed pixel values in the corresponding positions (i.e., above pixel, left pixel, above-left pixel, above-right pixel and left-down pixel respectively). Since the pixels values are directly copied, no escape code is required in these new modes.

Candidate Base Index Map Coding

Another aspect of the present invention addresses the candidate based index map coding. In one embodiment, a palette index candidate list is derived from the neighboring or coded palette index. For example, the candidate list may include the palette indices from above, left, above-left and above-right (i.e., above_palette_index, left_palette_index, above_left_palette_index, above_right_palette_index). The redundancy check can be applied to the candidate list to remove any redundant palette_index. When a palette_index is removed, the following palette_index or indices can be moved forward. For the vacated candidate, a predefined palette_index or a palette that is derived in certain predefined method can be used to fill the vacated candidate. For example, if the above_palette_index, left_palette_index and above_right_palette_index are the same, the redundant palette_index can be pruned (i.e., removed). After pruning, the corresponding candidate list becomes {above_palette_index, above_right_palette_index, above_palette_index, above_palette_index}. The left_palette_index and the above_right_palette_index are removed. The above_right_palette_index is moved to the second position. The rest candidates are filled with the above_palette_index.

Other methods to fill the vacated palette_index candidate may also be used. For example, the vacated palette_index candidate can be filled by the palette_index plus N and/or minus N, such as above_palette_index+1 and/or above_palette_index−1. The candidate list after pruning and filling with substitute candidates becomes {above_palette_index, above_right_palette_index, above_palette_index+1, above_palette_index−1}. The candidate index can be encoded to indicate which palette_index is used. The "no_pred" symbol corresponding to "no prediction" can be inserted to the candidate list to form the final candidate list. The position of the "no_pred" can be fixed. For example, the "no_pred" can be inserted to the third position. Then the final candidate list of the previous example will become {above_palette_index, above_right_palette_index, no_pred, above_palette_index, above_palette_index}. The codewords for the candidate indices can be fixed, or the maximum number of candidates in the list can be fixed. For example, if the maximum number of candidates in the list is limited to 3, the final candidate list of the previous example after applying the limit becomes {above_palette_index, above_right_palette_index, no_pred}.

The codeword for candidate list can be shown in Table 3. The codeword example 1 in Table 3 corresponds to a candidate list limiting the number of candidates to 3. The codeword example 2 in Table 3 corresponds to a candidate list limiting the number of candidates to 4.

TABLE 3

| index | Codeword 1 | Codeword 2 |
|---|---|---|
| 0 | 1 | 1 |
| 1 | 00 | 00 |
| 2 | 01 | 011 |
| 3 |  | 010 |

The context modeling for the candidate index may be related to the previous coded candidate index. For example, the context index of the first bin can be (0+previous_coded_index), the context index of the second bin can be (N+previous_coded_index), and the context index of the third bin can be (2N+previous_coded_index), where N can be 2 or 3. Furthermore, some of the bins of the codeword or all bins of the codeword can be coded in equal probability mode in context-adaptive binary arithmetic coding (CABAC).

Variable Length Code for Major Color (Palette) Index Coding

When a pixel is not coded using a prediction mode, the index with fixed length coding is transmitted according to JCTVC-O0182. However, according to an embodiment of the present invention, the colors in the major color table can be properly ordered to improve coding efficiency. For example, the colors in the color table can be ordered according to occurrence counts so that high occurrence colors will be located toward the beginning of the color table while low occurrence colors are located toward the end of the color table. Accordingly, a more efficient syntax design can be constructed to exploit such property. For example, for a major color table with 4 colors and the corresponding color indices being 0, 1, 2 and 3, the color indices are arranged according to occurrence counts so that color index 0 has the highest occurrence count and color index 3 has the lowest occurrence count. An example of fixed length codes and variable length codes for this color table can be designed as shown in Table 4.

TABLE 4

| Color index | Fixed length | variable length |
|---|---|---|
| 0 | 00 | 0 |
| 1 | 01 | 10 |
| 2 | 10 | 110 |
| 3 | 11 | 111 |

New Escape Pixel Value Signaling

In JCTVC-O0182, the escape pixel values are signaled after each line's prediction pattern. According to an embodiment of the present invention, the escape pixel values are transmitted during transmitting the index map. If a pixel is an escape pixel, its pixel value can be transmitted after the index signaling. Another embodiment, the escape pixel values are transmitted after entire index map coding (after entire coding unit's prediction pattern signaling).

To improve the parsing throughput of JCTVC-O0182, another embodiment of the present invention forces the escape index not to be predicted from neighboring indexes. The escape index should be signaled by a normal line mode and no-pred mode. Alternatively, the escape pixel is signaled by a new flag.

Advanced Color Table and Index Map Syntax Parsing

In JCTVC-O0182, the escape pixel values are signaled after the prediction pattern for each line. To improve the system performance, an embodiment of the present invention signals the escape pixel values after the prediction patterns for an entire coding unit are signaled (after signaling of the entire index map coding). This can improve parsing throughput since there is no need for frequency switching between parsing the prediction patterns and the escape pixel values. Furthermore, color table signaling can be moved to the syntax position after the prediction pattern signaling for the entire lines. If the color index is variable length coded, before parsing the prediction pattern for the entire lines in the coding unit, the decoder can parse major color number first. Otherwise, the predicted color index signaling for the normal (i.e., no prediction) pixels can be moved to the syntax position after the major color number signaling.

In one example, the decoder parses the prediction pattern for the entire coding unit first. Then, the decoder parses the N escape pixel values, where N is derived from the previous parsing result.

In another example, the decoder parses the prediction pattern for the entire coding unit first. Then, the decoder parses color tables. Finally, the decoder parses the N escape pixel values, where N is derived from the previous parsing result.

In yet another example, the decoder parses the major color number first. Then, the decoder parses the prediction pattern for the entire coding unit. Then, the decoder parses color tables. Finally, the decoder parses the N escape pixel values, where N is derived from the previous parsing result.

In JCTVC-N0247, N0249 and O0182, the index map is signaled after the color table signaling. An embodiment of the present invention signals the index first and uses the information by parsing the index map to encode other data.

The information determined by parsing the index map may correspond to the occurrence information. The occurrence information can be used to predict the palette and reconstruct pixel value.

Modification of Index Map Coding

In the index map coding of JCTVC-N0247, an escape flag is coded for the escape pixel. If the escape flag is true, one escape code is coded. Otherwise, a flag is signaled to indicate that the prediction mode is equal to the "index-run" mode or the "copy above" mode. An example of the codeword is shown in Table 5.

While the escape syntax is coded in the shorted codeword (i.e., 1 bit), however, the probability of the escape syntax is not that high. Accordingly, an embodiment of the present invention lowers the priority of "escape" syntax. Two examples of codewords for the "escape" syntax with lowered priority are shown in Table 5. In both examples, the codeword for the "escape" syntax is increased to 2 bits. In example 1, the "index-run" mode has the shortest code and in example, the "copy above" mode has the shortest code.

If context based coding is used, the context formation may use equal probability bins. In another example, the context formation of the bin that indicates whether the current mode is an "escape" mode (e.g. the first bin of JCTVC-N0247, the second bin in example 1 and example 2 in Table 5) can depend on the previous prediction mode or the palette size. For example, the context formation may depend on whether the last coded prediction mode is an "escape" mode. If the last coded prediction mode is the "escape" mode, the context coding uses one context and if the last coded prediction mode is not the "escape" mode, the context coding uses another context. In another example, if the palette size is equal to the maximum palette size, the context coding uses one context and if the palette size is not equal to the maximum palette size, the context coding uses another context.

TABLE 5

| Prediction Mode | Signal Bits according to JCTVC-N0247 | Current embodiment: example 1 | Current embodiment: example 2 |
|---|---|---|---|
| Escape | 1 | 00 | 00 |
| Index Run | 00 | 1 | 01 |
| Copy above | 01 | 01 | 1 |

FIG. 1 illustrates an exemplary flowchart of a system for palette coding using a candidate prediction mode list with the redundant prediction mode according to an embodiment of the present invention. The system receives input data associated with a current block as shown in step 110. The input data corresponds to pixel data or color indices of the current block to be coded at an encoder side or corresponds to coded data or coded color indices of the current block to be decoded at the decoder side. The input data may be retrieved from memory (e.g., computer memory, buffer (RAM or DRAM) or other media) or from a processor. A previous prediction mode associated with one or more previous samples is determined as shown in step 120. Whether a redundant prediction mode exists in a candidate prediction mode list for one or more current samples of the current block is determined based on the previous prediction mode and the candidate prediction mode list as shown in step 130. The test regarding whether the redundant prediction mode exists in the candidate prediction mode list is performed in step 140. If the result is "yes", steps 150 and 160 are performed. If the result is "no", steps 150 and 160 are bypassed. In step 150, the redundant prediction mode is removed from the candidate prediction mode list to generate a reduced candidate prediction mode list. In step 160, the palette encoding or decoding is applied to the current samples of the current block using the reduced candidate prediction mode list.

Figure 2:
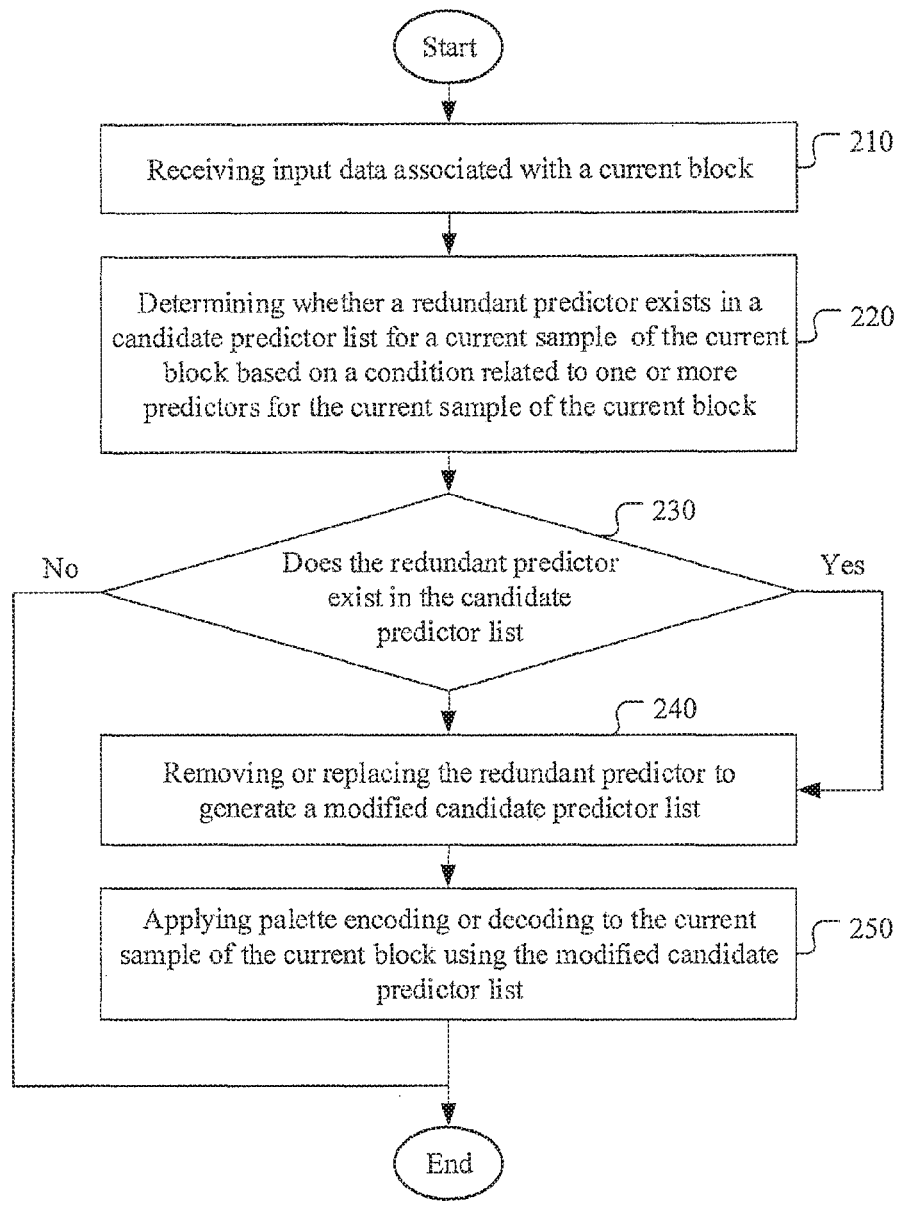
FIG. 2 illustrates an exemplary flowchart of a system for palette coding using a candidate predictor list with the redundant predictor removed or replaced according to an embodiment of the present invention.

FIG. 2 illustrates an exemplary flowchart of a system for palette coding using a candidate predictor list with the redundant predictor removed or replaced according to an embodiment of the present invention. The system receives input data associated with a current block as shown in step 210. Whether a redundant predictor exists in a candidate predictor list for a current sample of the current block is determined based on a condition related to one or more predictors for the current sample of the current block in step 220. The test regarding whether the redundant predictor exists in the candidate predictor list is performed in step 230. If the result is "yes", steps 240 and 250 are performed. If the result is "no", steps 240 and 250 are bypassed. In step 240, the redundant predictor is removed or replaced to generate a modified candidate predictor list. In step 250, the palette encoding or decoding is applied to the current sample of the current block using the modified candidate predictor list.

The flowcharts shown are intended to illustrate an example of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding blocks of video data using palette coding in a video coding system, the method comprising:

receiving input data associated with a current block of the video data;

determining a previous prediction mode used to apply palette encoding or decoding to one or more previous consecutive samples of the current block;

determining whether a redundant prediction mode, which is a copy-above-run mode, exists in a candidate prediction mode list for one or more current consecutive samples of the current block based on the previous prediction mode and the candidate prediction mode list, wherein the one or more current consecutive samples of the current block are next in sequence following the one or more previous consecutive samples; and if the redundant prediction mode exists in the candidate prediction mode list, removing the redundant prediction mode from the candidate prediction mode list to generate a reduced candidate prediction mode list, and applying palette encoding or decoding to said one or more current consecutive samples of the current block using the reduced candidate prediction mode list, wherein the candidate prediction mode list includes the copy-above-run mode to use one or more corresponding first samples in an above row to predict one or more first samples of the current block, and an index-run mode to encode or decode one or more second samples of the current block using a same first sample value;

determining a relationship between predictors corresponding to color indexes of an above pixel and a left pixel in a candidate predictor list for a current sample of the current block, wherein an above predictor corresponds to an above color index of the above pixel, and a left predictor corresponds to a left color index of the left pixel;

determining, based on the relationship, whether a redundant predictor exists in the candidate predictor list for the current sample of the current block based on a condition related to one or more predictors for the current sample of the current block, wherein the one or more predictors for the current sample of the current block are derived from at least two neighboring samples of the current sample, and wherein the condition constitutes at least whether the left color index of the left predictor is equal to the above color index of the above predictor; and when the left color index of the left predictor is equal to the above color index of the above predictor:
  determining that the redundant predictor exists in the candidate predictor list;
  removing the left predictor by skipping a signaling of at least one bit associated with the left predictor to generate a modified candidate predictor list; and
  applying palette encoding or decoding to the current sample of the current block using the modified candidate predictor list.

2. The method of claim 1, wherein when the previous prediction mode is equal to the copy-above-run mode, the redundant prediction mode is determined to be the copy-above-run mode.

3. The method of claim 1, wherein the candidate prediction mode list further comprises a pixel mode to encode or decode an individual pixel sample value of an individual third sample of the current block.

4. The method of claim 1, wherein when the copy-above-run mode is used for said one or more current consecutive samples of the current block, a run value corresponding to a number of said one or more current consecutive samples is signaled in a bitstream or parsed from the bitstream.

5. The method of claim 1, wherein when the index-run mode is used for said one or more current consecutive samples of the current block, the same first sample value and a run value corresponding to a number of said one or more current consecutive samples of the current block are signaled in a bitstream or parsed from the bitstream.

6. The method of claim 1, wherein when the previous prediction mode is equal to the copy-above-run mode, the prediction mode is inferred as the index-run mode.

7. The method of claim 1, wherein the candidate prediction mode list further comprises a copy-above-N-row mode to use one or more corresponding first samples in above R rows to predict one or more first samples of the current block.

8. The method of claim 7, wherein a first number of said one or more first samples and a second number corresponding to R are signaled in a bitstream or parsed from the bitstream.

9. The method of claim 8, wherein codeword and binarization of the second number corresponding to R depends on the previous prediction mode and a last coded second number, a row index of said one or more current consecutive samples, and a possible maximum number of the second number.

10. The method of claim 8, wherein if the previous prediction mode is copy-above-N-row mode and a current prediction mode is also copy-above-N-row mode, if a received codeword of the second number corresponding to R is equal to or larger than the second number of previous copy-above-N-row mode, an actual reconstructed second number is increased by 1.

11. The method of claim 1, further comprising if the redundant prediction mode does not exist in the candidate prediction mode list, applying palette encoding or decoding to said one or more current consecutive samples of the current block using the candidate prediction mode list.

12. The method of claim 1, wherein whether a current prediction mode is placed into the candidate prediction mode list depends on position of said one or more current consecutive samples of the current block or coded syntax for the current prediction mode.

13. The method of claim 12, wherein the current prediction mode is not placed into the candidate prediction mode list if reference pixels of the current prediction mode are not available.

14. The method of claim 12, wherein a last prediction mode corresponding to a last coded syntax is not placed into the candidate prediction mode list.

15. The method of claim 12, wherein a prediction mode index corresponding to the current prediction mode is signaled in a bitstream or parsed from the bitstream.

16. The method of claim 1, wherein said determining whether a redundant prediction mode exists in the candidate prediction mode list for one or more current consecutive samples of the current block is further based on a position of the current consecutive sample.

17. A method of coding blocks of video data using palette coding in a video coding system, the method comprising:
  receiving input data associated with a current block of the video data;
  determining a relationship between predictors corresponding to color indexes of an above pixel and a left pixel in a candidate predictor list for a current sample of the current block, wherein an above predictor corresponds to an above color index of the above pixel, and a left predictor corresponds to a left color index of the left pixel;
  determining, based on the relationship, whether a redundant predictor exists in the candidate predictor list for the current sample of the current block based on a condition related to one or more predictors for the current sample of the current block, wherein the one or more predictors for the current sample of the current block are derived from at least two neighboring samples of the current sample, and wherein the condition constitutes at least whether the left color index of the left predictor is equal to the above color index of the above predictor; and
  when the left color index of the left predictor is equal to the above color index of the above predictor:
    determining that the redundant predictor exists in the candidate predictor list;
    removing the left predictor by skipping a signaling of at least one bit associated with the left predictor to generate a modified candidate predictor list; and
    applying palette encoding or decoding to the current sample of the current block using the modified candidate predictor list.

18. The method of claim 17, wherein the candidate predictor list consists of a copy-above predictor to use a first sample in an above row to predict a first sample of the current block, a copy-left predictor to use a left second sample to predict a second sample of the current block, and one or more other modes.

19. The method of claim 18, wherein if the copy-above predictor and the copy-left predictor are the same for the current sample, the copy-above predictor or the copy-left predictor is determined to be the redundant predictor.

20. The method of claim 19, wherein the copy-above predictor or the copy-left predictor determined as the redundant predictor is removed from the candidate predictor list.

21. The method of claim 17, wherein said removing or replacing the redundant predictor replaces the redundant predictor by a replacement candidate predictor determined based on sample position of a selected candidate predictor, a last coded syntax, predefined sample predictor, or sample predictor from predefined color index.

22. The method of claim 21, wherein if the sample position of the selected candidate predictor is outside the current block, the selected candidate predictor is not placed into the modified candidate predictor list.

23. The method of claim 21, wherein if the candidate predictor list consists of a copy-above predictor to use a first sample in an above row to predict a first sample of the current block and the last coded syntax is the copy-above predictor, the last coded syntax is not placed into the modified candidate predictor list.

24. An apparatus of coding blocks of video data using palette coding in a video coding system, the apparatus comprising one or more electronic circuits configured to:
receive input data associated with a current block of the video data;
determine a previous prediction mode used to apply palette encoding or decoding to one or more previous consecutive samples of the current block;
determine whether a redundant prediction mode, which is a copy-above-run mode, exists in a candidate prediction mode list for one or more current consecutive samples of the current block based on the previous prediction mode and the candidate prediction mode list, wherein the one or more current consecutive samples of the current block are next in sequence following the one or more previous consecutive samples; and
if the redundant prediction mode exists in the candidate prediction mode list, remove the redundant prediction mode from the candidate prediction mode list to generate a reduced candidate prediction mode list, and apply palette encoding or decoding to said one or more current consecutive samples of the current block using the reduced candidate prediction mode list,
wherein the candidate prediction mode list includes the copy-above-run mode to use one or more corresponding first samples in an above row to predict one or more first samples of the current block, and an index-run mode to encode or decode one or more second samples of the current block using a same first sample value;
determine a relationship between predictors corresponding to color indexes of an above pixel and a left pixel in a candidate predictor list for a current sample of the current block, wherein an above predictor corresponds to an above color index of the above pixel, and a left predictor corresponds to a left color index of the left pixel;
determine, based on the relationship, whether a redundant predictor exists in the candidate predictor list for the current sample of the current block based on a condition related to one or more predictors for the current sample of the current block, wherein the one or more predictors for the current sample of the current block are derived from at least two neighboring samples of the current sample, and wherein the condition constitutes at least whether the left color index of the left predictor is equal to the above color index of the above predictor; and
when the left color index of the left predictor is equal to the above color index of the above predictor:
determine that the redundant predictor exists in the candidate predictor list;
remove the left predictor by skipping a signaling of at least one bit associated with the left predictor to generate a modified candidate predictor list; and
apply palette encoding or decoding to the current sample of the current block using the modified candidate predictor list.

25. The apparatus of claim 24, wherein when the copy-above-run mode is used for said one or more current consecutive samples of the current block, a run value corresponding to a number of said one or more current consecutive samples of the current block is signaled in a bitstream or parsed from the bitstream.

26. The method of claim 13, wherein if one of the one or more current consecutive samples is in the first row of the current CU, the copy-above-run mode is not placed into the candidate prediction mode list.

27. The method of claim 13, wherein if one of the one or more current consecutive samples is in the first row of the current CU, the prediction mode is inferred as the index-run mode.

28. The apparatus of claim 25, wherein when the previous prediction mode is equal to the copy-above-run mode, the prediction mode is inferred as the index-run mode.

29. The apparatus of claim 25, wherein if one of the one or more current consecutive samples is in the first row of the current CU, the copy-above-run mode is not placed into the candidate prediction mode list and the prediction mode is inferred as the index-run mode.

30. The method of claim 1, wherein the candidate prediction mode list further includes a copy-above-N-row mode to use a plurality of corresponding first samples in above R rows to predict one or more first samples of the current block, and
wherein if two consecutive copy-above-N-row modes with a same Rprev value occur, the two copy-above-N-row modes with the same Rprev value are combined into one copy-above-N-row mode with a new run value equal to a sum of two individual run values.

* * * * *